US008332225B2

(12) United States Patent
Zhao et al.

(10) Patent No.: US 8,332,225 B2
(45) Date of Patent: Dec. 11, 2012

(54) TECHNIQUES TO CREATE A CUSTOM VOICE FONT

(75) Inventors: Sheng Zhao, Beijing (CN); Zhi Li, Beijing (CN); Shenghao Qin, Beijing (CN); Chiwei Che, Beijing (CN); Jingyang Xu, Kirkland, WA (US); Binggong Ding, Beijing (CN)

(73) Assignee: Microsoft Corporation, Redmond, WA (US)

( * ) Notice: Subject to any disclaimer, the term of this patent is extended or adjusted under 35 U.S.C. 154(b) by 719 days.

(21) Appl. No.: 12/478,407

(22) Filed: Jun. 4, 2009

(65) Prior Publication Data

US 2010/0312563 A1 Dec. 9, 2010

(51) Int. Cl.

| | |
|---|---|
| ***G10L 13/00*** | (2006.01) |
| ***G10L 21/00*** | (2006.01) |
| ***G10L 15/00*** | (2006.01) |
| ***G10L 15/04*** | (2006.01) |
| ***H04M 11/00*** | (2006.01) |

(52) U.S. Cl. ........ 704/258; 704/260; 704/265; 704/269; 704/275; 704/231; 704/251; 704/252; 704/253; 704/254; 704/255; 379/88.16

(58) Field of Classification Search .................. 704/258, 704/260, 275, 365, 369, 265, 269, 231, 251–255; 379/88.16
See application file for complete search history.

(56) References Cited

U.S. PATENT DOCUMENTS 6,076,059 A * 6/2000 Glickman et al. ............ 704/260
6,081,780 A * 6/2000 Lumelsky ..................... 704/260
6,622,121 B1 * 9/2003 Crepy et al. .................. 704/243
6,865,533 B2 * 3/2005 Addison et al. ............... 704/260
6,934,684 B2 * 8/2005 Alpdemir et al. ............. 704/265
7,139,715 B2 11/2006 Dragosh et al.
7,451,089 B1 11/2008 Gupta et al.
7,478,171 B2 1/2009 Ramaswamy et al.
7,483,832 B2 1/2009 Tischer
7,505,056 B2 3/2009 Kurzweil et al.
7,711,562 B1 * 5/2010 Davis et al. ................... 704/258
7,739,113 B2 * 6/2010 Kaneyasu ..................... 704/260
7,962,341 B2 * 6/2011 Braunschweiler ............ 704/258
8,131,545 B1 * 3/2012 Moreno et al. ................ 704/235
2002/0095289 A1 * 7/2002 Chu et al. ...................... 704/258
2002/0173962 A1 * 11/2002 Tang et al. .................... 704/260
2003/0028380 A1 2/2003 Freeland et al.
2005/0071163 A1 * 3/2005 Aaron et al. .................. 704/260
2006/0095265 A1 5/2006 Chu et al.
2006/0136213 A1 * 6/2006 Hirose et al. .................. 704/260
2008/0133510 A1 6/2008 Timmons
2008/0140407 A1 6/2008 Aylett et al.

(Continued)

OTHER PUBLICATIONS

T. Saito and M. Sakamoto, "A VoiceFont Creation Framework for Generating Personalized Voices," IEICE Transactions, vol. 88-D, No. 3, pp. 525-534, 2005.*

(Continued)

*Primary Examiner* — Paras D Shah

(57) ABSTRACT

Techniques to create and share custom voice fonts are described. An apparatus may include a preprocessing component to receive voice audio data and a corresponding text script from a client and to process the voice audio data to produce prosody labels and a rich script. The apparatus may further include a verification component to automatically verify the voice audio data and the text script. The apparatus may further include a training component to train a custom voice font from the verified voice audio data and rich script and to generate custom voice font data usable by the TTS component. Other embodiments are described and claimed.

15 Claims, 7 Drawing Sheets

*System 100*

U.S. PATENT DOCUMENTS

| | | | | |
|---|---|---|---|---|
| 2008/0235025 | A1* | 9/2008 | Murase et al. | 704/260 |
| 2008/0288256 | A1* | 11/2008 | Agapi et al. | 704/260 |
| 2009/0003548 | A1 | 1/2009 | Baird et al. | |
| 2009/0022284 | A1 | 1/2009 | Matula | |
| 2009/0037179 | A1 | 2/2009 | Liu et al. | |
| 2009/0055162 | A1 | 2/2009 | Qian et al. | |
| 2009/0070115 | A1* | 3/2009 | Tachibana et al. | 704/260 |

OTHER PUBLICATIONS

A. Verma and A. Kumar, "Voice fonts for individuality representationand transformation," ACM Trans. Speech, Language Processing, vol. 2,No. 1, pp. 1-19, 2005.*

"Voice Browser", Retrieved at <<http://en.wikipedia.org/wiki/Voice_browser>>, Mar. 31, 2009, p. 1.

"Web Based Ways to Convert Text into Speech, Free!", Retrieved at <<http://www.tothepc.com/archives/5-web-based-ways-to-convert-text-into-speech-free/>>, Mar. 31, 2009, pp. 7.

"Speech Control Editor", Retrieved at <<http://msdn.microsoft.com/en-us/library/bb857375.aspx>>, Apr. 1, 2009, p. 1.

Srisa-An, et al., "Putting Voice into Wireless Communications", Retrieved at <<http://www.cs.caltech.edu/~weixl/research/read/VoiceXML.htm>>, Mar. 31, 2009, pp. 5.

"Speech Synthesis", Retrieved at <<http://en.wikipedia.org/wiki/Speech_synthesis>>, Apr. 1, 2009, pp. 10.

* cited by examiner

System 100

300

```
<si id="0000000001">
    <text>Mom strongly dislikes appetizers .</text>
    <sent>
      <text>Mom strongly dislikes appetizers .</text>
      <words>
        <w v="Mom" p="m . aa 1 . m" type="normal" pos="noun" />
        <w v="strongly" p="s . t . r . ao 1 . ng - l . iy" type="normal" pos="adv" />
        <w v="dislikes" p="d . ih - s . l . ay 1 . k . s" type="normal" pos="verb" />
        <w v="appetizers" p="ae 1 - p . ax - t . ay 2 - z . ax . r . z" type="normal" pos="noun" br="4"
wt="F" />
        <w v="." type="punc" pos="symbol" br="4" />
      </words>
    </sent>
  </si>
```

FIG. 3

TECHNIQUES TO CREATE A CUSTOM VOICE FONT

BACKGROUND

Text-to-speech (TTS) systems may be used in many different applications to "read" text out loud to a computer operator. The voice used in a TTS system is typically provided by the TTS system vendor. TTS systems may have a limited selection of voices available. Further, conventional production of a TTS voice may be time-consuming and expensive.

It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to create a custom voice font. Some embodiments are particularly directed to techniques to create a custom voice font for sharing and hosting TTS operations over a network. In one embodiment, for example, a technique may include receiving voice audio data and a corresponding text script from a client; processing the voice audio data to produce prosody labels and a rich script; automatically verifying the voice audio data using the text script; training a custom voice font from the verified voice audio data and rich script; and generating custom voice font data usable by a text-to-speech engine. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 3 illustrates an embodiment of a rich script.

DETAILED DESCRIPTION

Various embodiments are directed to techniques and systems to create and provide custom voice "fonts" for use with text-to-speech (TTS) systems. Embodiments may include a web based system and technique for efficient, easy to use custom voice creation that allows operators to upload or record voice data, analyze the data to remove errors, and train a voice font. The operator may get a custom voice font that may be downloaded and installed to his local computer to use with a TTS engine on his computer. Embodiments may also let a web system host the custom voice font so that the operator may use a TTS service with his voice from any device in communication with the web system host.

Figure 1:
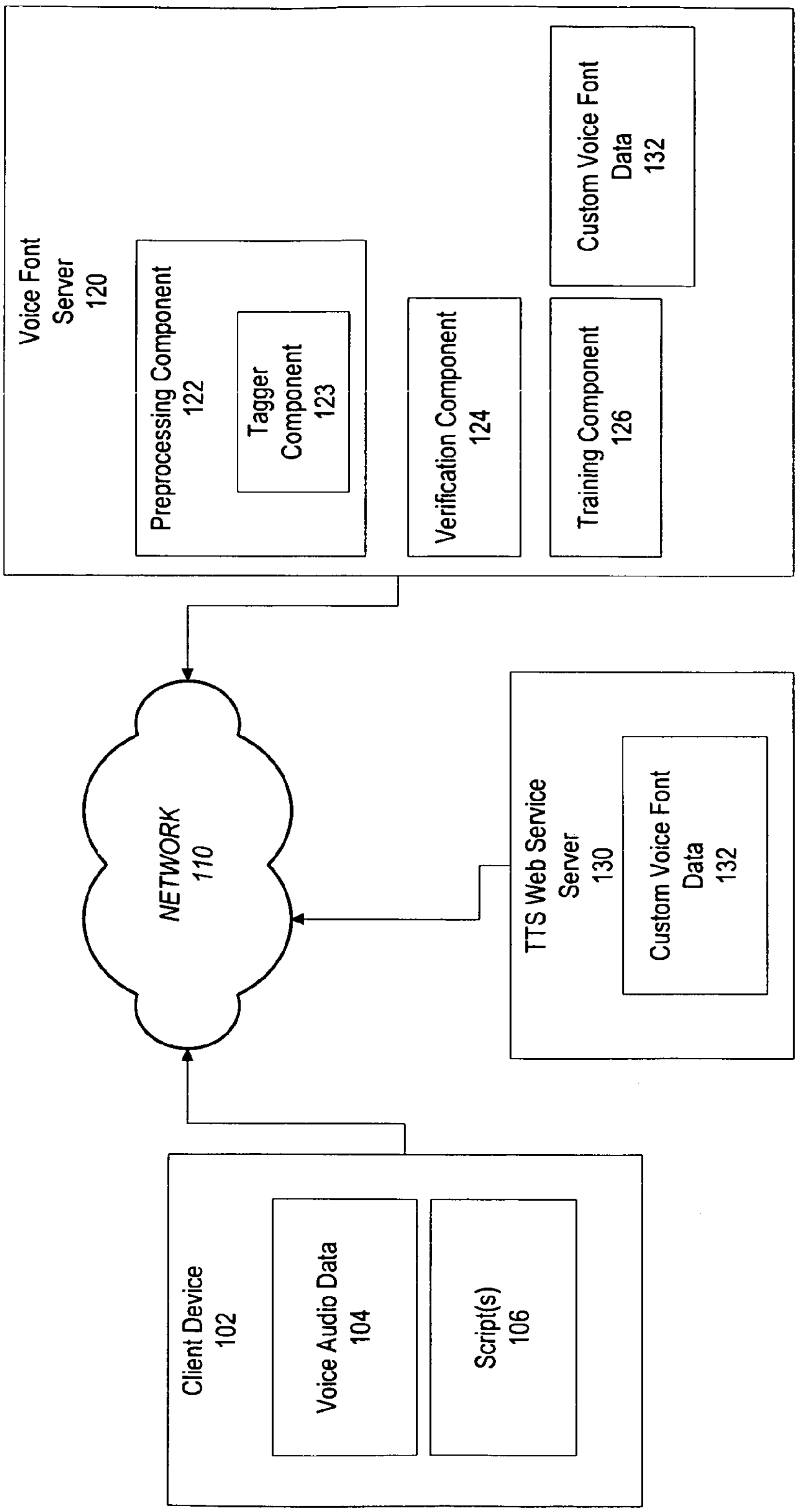
FIG. 1 illustrates an embodiment of a first system.

FIG. 1 illustrates a block diagram for a system 100 to create a custom voice font. In one embodiment, for example, the system 100 may comprise a computer-implemented system 100 having multiple components, such as client device 102, voice font server 120, and text to speech service server 130. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

The components may be communicatively coupled via various types of communications media. The components may coordinate operations between each other. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In various embodiments, the system 100 may include a client device component 102. Client device 102 may be a device, such as, but not limited to, a personal desktop or laptop computer. Client device 102 may include voice audio data 104 and one or more scripts 106. Voice audio data 104 may be recorded voice data, such as wave files. Voice audio data 104 may also be voice data received live via an input source, such as a microphone (not shown). Scripts 106 may be files, such as text files, or word processing documents, containing sentences that correspond to what is spoken in the voice audio data 104.

In various embodiments, the system 100 may include a voice font server component 120. Voice font server 120 may be device, such as, but not limited to, a server computer, a personal computer, a distributed computer system, etc. Voice font server 120 may include a preprocessing component 122, a verification component 124, a training component 126 and a custom voice font generator 128. Voice font server 120 may further store one or more custom voice fonts in the form of custom voice font data 132.

Voice font server 120 may provide a user-friendly web-based or network accessible user interface to let an operator upload his existing voice audio data 104 and corresponding scripts 106 for each sentence. Voice font server 120 may also prompt a list of sentences for an operator to record his voice and upload it. The number of sentences to be recorded can be divided into several categories, which may correspond to levels of voice quality for the final voice font. In general, voice quality of the final voice font may improve with increasing amounts of data provided.

Preprocessing component 122 may process voice audio data 104 received via network 110 from client device 102. Processing may include digital signal processing (DSP)-like filtering or re-sampling. In an embodiment, a high-accuracy text analysis module, e.g. tagger component 123, may produce pronunciation or linguistic prosody labels (like break or emphasis) from the raw text of scripts 106. Prosody refers to the rhythm, stress, intonation and pauses in speech. The output of the tagger may be a rich script, such as a rich XML script, which includes pronunciation, POS (part-of-speech), and prosody events on each word. The information in the XML script may be used to train the custom voice. Given the pronunciation and voice audio data 104 for each sentence in scripts 106, voice font server 120 may do phone alignment on the voice audio data 104 to get speech segment information for each phone.

Verification component 124 may use techniques based on speech recognition technology to analyze the voice audio data 104 and scripts 106 with pronunciation. In an embodiment, a basic confidence score may be used. The sentences in scripts 106 may be ordered by the degree of matching between the recognized speech from the voice audio data 104 and the corresponding text from the script. The sentences with large mismatch, compared to a threshold, may be discarded from the sentence pool and will not be used further. For example, 5 to 10 percent of sentences may be discarded. The remaining sentences may be retained.

Training component 126 may train the voice font by running through a number of training procedures. Training a voice font may include performing a forced alignment of the acoustic information in the voice audio data with the rich script. In an embodiment using unit selection TTS, training component 126 may assemble the units into a voice data base and build indexing for the database. In an embodiment using HMM based trainable TTS, training component 126 may build acoustic and prosody models from the training data to be used at runtime. Training component 126 may generate the custom voice font data 132 that can be consumed by a runtime TTS engine.

System 100 may further include a text to speech (TTS) service server 130. TTS service server 130 may store custom voice font data 132 on a storage medium (not shown) for download and installation on a client device. In an embodiment, a downloaded voice font may be usable by any application on a client device, provided that the operator has installed a TTS runtime engine of the same version.

TTS service server 130 may host a custom voice font as the TTS service with a standard protocol, such as HTTP or SOAP. An operator may then choose to call the TTS functionality with a programming language in an application. The audio output for the TTS engine may be streamed to the calling application, or may be downloaded after it is generated.

In an embodiment, TTS service server 130 and voice font server 120 may operate on the same device. Alternatively, TTS service server 130 and voice font server 120 may be physically separate. TTS service server 130 and voice font server 120 may communicate over network 110, although such communication is not necessary. Once an operator has created and downloaded a custom voice font, the operator may then upload the same custom voice font to TTS service server 130.

Figure 2:
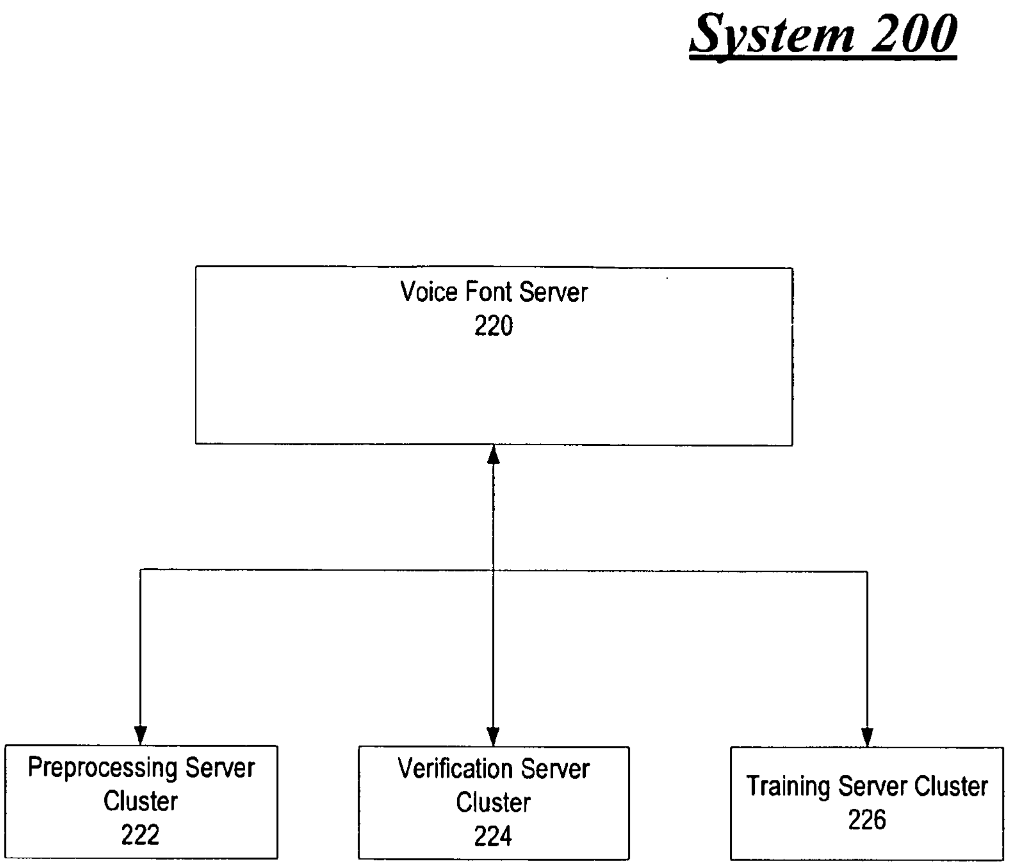
FIG. 2 illustrates an embodiment of a second system.

FIG. 2 illustrates a block diagram of a system 200 to create custom voice fonts. The system 200 may be similar to a portion of the system 100. In system 200, the functionality of system 100 may be distributed over a machine pool having one or more clusters of computers. For example, preprocessing component 122 may operate on preprocessing server cluster 222. Verification component 124 may operate on verification server cluster 224. Training component 126 may operate on training server cluster 226. The functionality of system 200 may occur substantially in parallel, and may improve efficiency.

The machine pool may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

FIG. 3 illustrates an example of a portion 300 of a rich script that corresponds to one sentence of the voice audio data 104 and the scripts 106. In this example, portion 300 is created in extensible markup language (XML). Embodiments are not limited to this example. Line 1 of portion 300 may contain an identifier for the sentence that portion 300 refers to. Lines 2 and 4 may contain the full text of the sentence that was spoken, including punctuation. Lines 6-10 may each refer to one word or punctuation mark in the sentence. For example, in line 6, portion 300 may indicate the word itself, e.g. v="Mom", a pronunciation, e.g. p="m. aa 1 . m", a type, e.g. type="normal", and a part of speech, e.g. pos="noun". Type may refer to the type of sentence, e.g. a statement or a question. The prosody label 'br' may indicate a break or pause in speech. Additional information may be included, and is not limited to this example.

Figure 4:
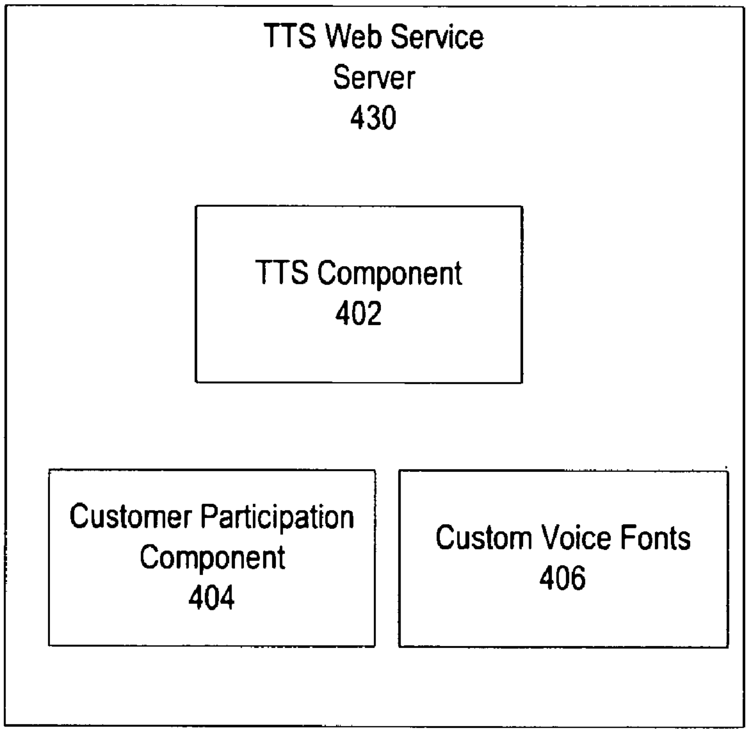
FIG. 4 illustrates an embodiment of a system.

FIG. 4 illustrates a block diagram 400 of a TTS web service server 430. TTS web service server 430 may be an embodiment of TTS web service server 130. In addition to storing one or more custom voice fonts 406, TTS web service server 430 may also include TTS component 402 and customer participation component 404.

TTS component 402 may provide TTS functionality to an operator over a network, e.g. network 110. In an embodiment, an operator using a client device may request TTS services from TTS web service server 430. The request may include text in some form to be converted to speech. In an embodiment, an operator may link to text that he wishes to have converted to speech. In an embodiment, the text may be uploaded to TTS web service server 430. In an embodiment, TTS component may provide a downloadable application or browser applet to read selected text. The embodiments are not limited to these examples.

Customer participation component 404 may provide functionality for users of the TTS service to interact with the TTS service. For example, customer participation component 404 may receive votes or ratings on custom voice fonts 406.

Customer participation component 404 may award, track and collect resources to and from operators according to a participation activity. Resources may include, for example, points or money that may be exchanged for services on the TTS web service server. Participation activities may include, for example, but not limited to, receiving the highest rating (or most votes) for a custom voice font; uploading a custom vice font; downloading a voice font, etc. From the ratings or votes, customer participation component 404 may feature highest rated fonts, for example, in various categories, such as most professional, funniest, etc.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 5:
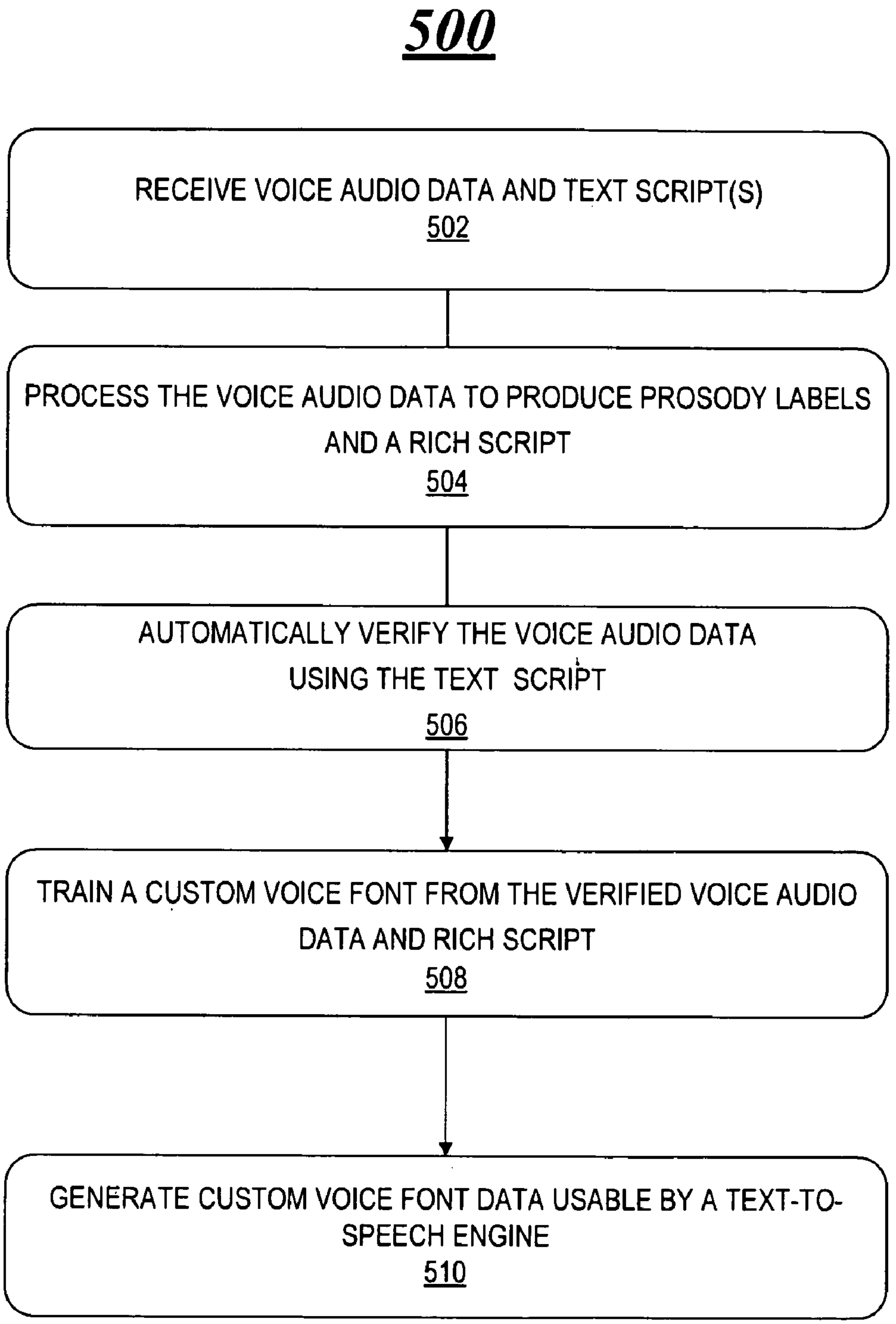
FIG. 5 illustrates an embodiment of a logic flow.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 may receive voice audio data and corresponding scripts at block 502. For example, voice font server 120 may receive audio files, such as WAV files, or live audio data from client device 102.

The logic flow 500 may process the voice audio data to produce prosody labels and a rich script at block 504. For example, preprocessing component 122 or preprocessing server cluster 222 may process voice audio data 104, including DSP-like filtering or re-sampling. In an embodiment, a high-accuracy text analysis module may produce pronunciation or linguistic prosody labels from the raw text of scripts 106. The output of the tagger may be a rich script that may include, for example, pronunciation, POS (part-of-speech), and prosody events on each word.

The logic flow 500 may automatically verify the voice audio data and the rich script at block 506. For example, may use techniques based on speech recognition technology to analyze the voice audio data 104 and scripts 106 with pronunciation. The sentences having a higher than threshold degree of matching between the recognized speech from the voice audio data and the script text may be retained for further processing.

The logic flow 500 may train a custom voice font from the retained sentences of verified voice audio data and the rich script at block 508. For example, training component 126 or training server cluster 226 may train the voice font by running through a number of training procedures. Training a voice font may include performing a forced alignment of the acoustic information in the voice audio data with the rich script.

The logic flow 500 may generate a custom voice font usable by a text-to-speech engine at block 510. For example, training component 126 or training server cluster 226 may generate the custom voice font data 132 that can be consumed by a runtime TTS engine.

Figure 6:
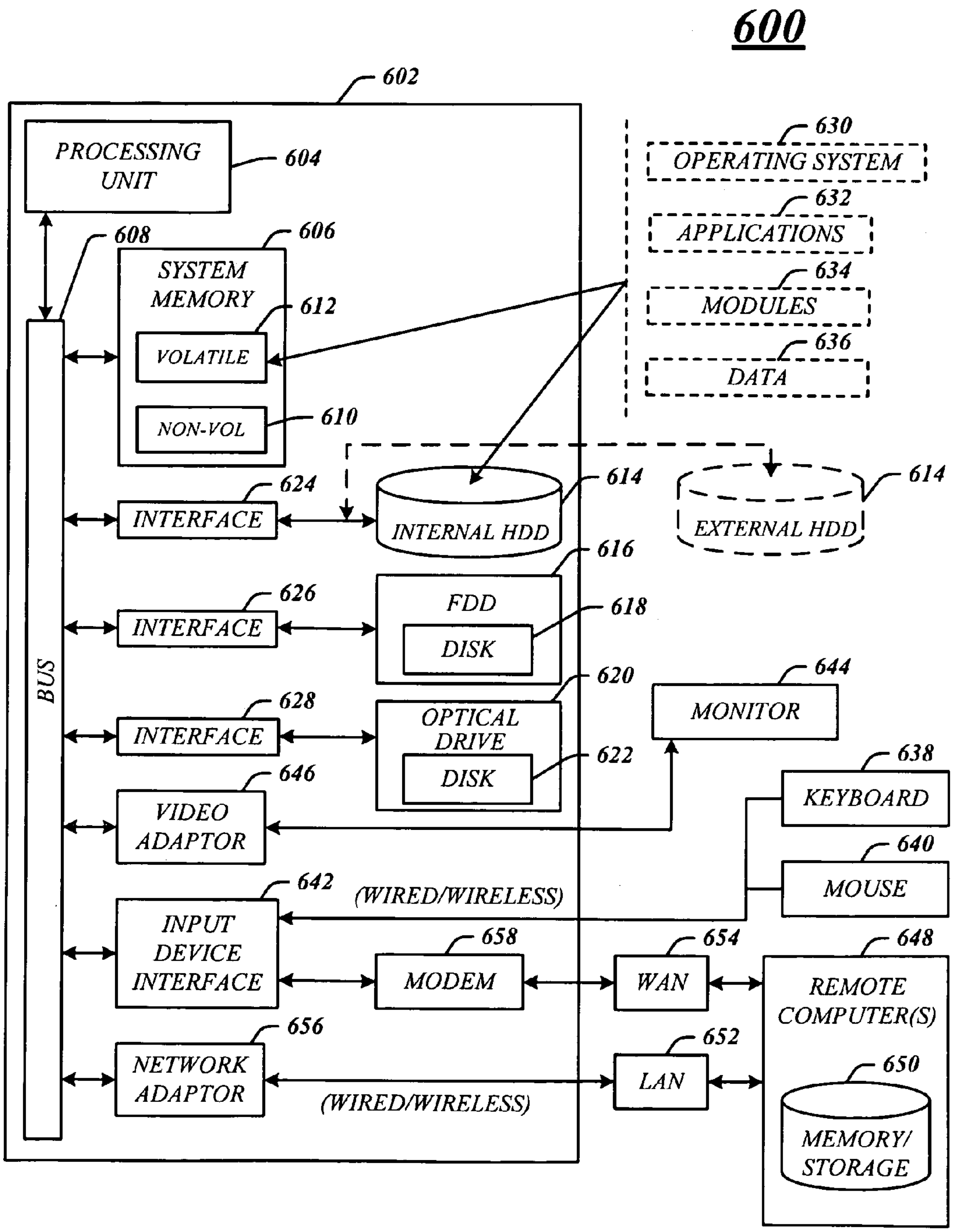
FIG. 6 illustrates an embodiment of a computing architecture.

FIG. 6 illustrates an embodiment of an exemplary computing architecture 600 suitable for implementing various embodiments as previously described. The computing architecture 600 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors. Dual microprocessors and other multi-processor architectures may also be employed as the processing unit 604. The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures.

The system memory 606 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media, including an internal hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. The one or more application programs 632, other program modules 634, and program data 636 can include, for example, preprocessing component 122, verification component 124 and training component 126.

A user can enter commands and information into the computer 602 through one or more wire/wireless input devices, for example, a keyboard 638 and a pointing device, such as a mouse 640. Other input devices may include a microphone, an infra-red (IR) remote control, a joystick, a game pad, a stylus pen, touch screen, or the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 7:
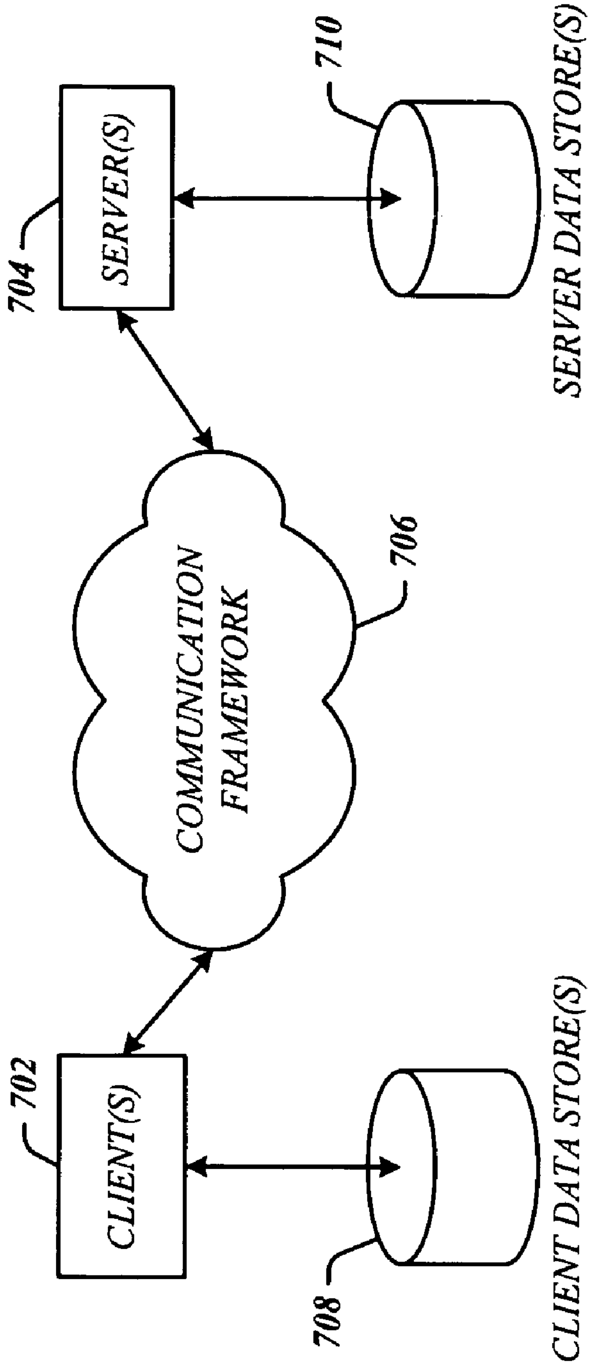
FIG. 7 illustrates an embodiment of a communications architecture.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, and so forth. The embodiments, however, are not limited to implementation by the communications architecture 700.

As shown in FIG. 7, the communications architecture 700 comprises includes one or more clients 702 and servers 704. The clients 702 may implement the client device 102. The servers 704 may implement the voice font server 120, and/or TTS web service server 130, 430. The clients 702 and the servers 704 are operatively connected to one or more respective client data stores 708 and server data stores 710 that can be employed to store information local to the respective clients 702 and servers 704, such as cookies and/or associated contextual information.

The clients 702 and the servers 704 may communicate information between each other using a communication framework 706. The communications framework 706 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 702 and the servers 704 may include various types of standard communication elements designed to be interoperable with the communications framework 706, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 702 and a server 704 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:

receiving voice audio data and a corresponding text script from a client at a server;

processing the voice audio data to produce prosody labels at the server by producing of linguistic prosody labels and pronunciation prosody labels from the text script in a tagger module, and a xml-based rich script comprising of: pronunciation, part of speech, and a prosody event for each word in the text script;

automatically verifying the voice audio data using the text script at the server by determining a degree of matching between the voice audio data and a corresponding pronunciation in the rich script, ordering sentences in the text script according to the degree of matching, and retaining a sentence having a degree of matching higher than a threshold;

training a custom voice font from the verified voice audio data and rich script at the server where prosody and acoustic models are generated based on the training; and generating custom voice font data usable by a text-to-speech engine at the server based on the training.

2. The method of claim 1, wherein receiving voice audio data comprises at least one of:

receiving an existing recording of a voice speaking the text of the text script; or receiving a live recording of a voice speaking the text of the text script.

3. The method of claim 1, wherein training the custom voice font comprises training on the retained sentences.

4. The method of claim 1, further comprising:

providing the custom voice font data for download and installation onto a client computer.

5. The method of claim 1, further comprising:

hosting a TTS web service with the custom voice font data.

6. The method of claim 5, wherein hosting a TTS web service comprises:

receiving a request including text from a remote client to convert text to speech using the custom voice font data;

converting the text to speech using the custom voice font data; and providing the speech to the remote client.

7. The method of claim 6, further comprising:

receiving ratings on the custom voice font data from operators of remote clients; and at least one of: awarding, tracking or collecting resources to and from the operators according to a participation activity.

8. The method of claim 5, wherein hosting a TTS web service comprises:

receiving a request from a remote client to convert text to speech using the custom voice font data; and providing at least one of a web applet or a downloadable application that performs the request on the remote client.

9. An article of manufacture comprising a computer-readable storage medium containing instructions that if executed enable a system to:

process voice audio data to produce of linguistic prosody labels and pronunciation prosody labels from a corresponding text script in a tagger module, and a xml based rich script comprising of: pronunciation, part of speech, and a prosody event for each word in the text script;

automatically verify the voice audio data and the corresponding text script by performing speech recognition on the voice audio data to produce recognized speech, determining a degree of matching between the recognized speech and the text script, ordering sentences in the text script according to the degree of matching, and retaining a sentence having a degree of matching higher than a threshold where prosody and acoustic models are generated based on the training;

train a custom voice font from the verified voice audio data and rich script; and generate custom voice font data usable by a text-to-speech engine based on the training.

10. The article of claim 9, further comprising instructions that if executed enable the system to:

receive a request including text from a remote client to convert the text to speech using the custom voice font data;

convert the text to speech using the custom voice font data; and provide the speech to the remote client.

11. The article of claim 10, further comprising instructions that if executed enable the system to:

receive ratings on the custom voice font data from operators of remote clients; and at least one of: award, track or collect resources to and from the operators according to a participation activity.

12. An apparatus, comprising:

a processor;

a storage medium to receive and store custom voice fonts; and a text-to-speech (TTS) component operative on the processor to convert text to speech using one of the custom voice fonts at a request of a remote client; wherein a custom voice font is generated by:

processing voice audio data received from a client to produce prosody labels by producing of linguistic prosody labels and pronunciation prosody labels from a text script corresponding to the voice audio data in a tagger module, and a rich script comprising of: pronunciation, part of speech, and a prosody event for each word in the text script;

automatically verifying the voice audio data using the text script by determining a degree of matching between the voice audio data and a corresponding pronunciation in the xml based rich script, ordering sentences in the text script according to the degree of matching, and retaining a sentence having a degree of matching higher than a threshold where prosody and acoustic models are generated based on the training; and training the custom voice font from the verified voice audio data and rich script.

13. The apparatus of claim 12, comprising a customer participation component to receive ratings on the custom voice fonts from operators of remote clients.

14. The apparatus of claim 13, the customer participation component to award, track and collect resources to and from operators according to a participation activity.

15. The apparatus of 14, wherein the participation activities include at least one of: uploading a custom voice font to the storage medium, downloading a custom voice font to a remote client from the storage medium, or receiving a highest rating for a custom voice font.

* * * * *